United States Patent Office 3,751,449
Patented Aug. 7, 1973

3,751,449
CYCLOALIPHATIC AND PHENYLALKYL
ACRYLATES AND VINYL ESTERS
Ramsis Gobran, Roseville, and Hanspeter Knoepfel and
Spencer F. Silver, White Bear Lake, Minn., assignors to
Minnesota Mining and Manufacturing Company, St.
Paul, Minn.
No Drawing. Filed June 26, 1969, Ser. No. 836,946
Int. Cl. C07c 69/54
U.S. Cl. 260—486 R                6 Claims

ABSTRACT OF THE DISCLOSURE

Carbocyclic alkyl acrylates and vinyl esters of the general formula:

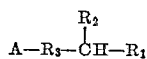

where

A is acryloxy ($CH_2=CHCOO-$), methacryloxy $$[CH_2=C(CH_3)COO-],$$

or carbovinyloxy ($CH_2=CHOCO-$), $R_1$ is a cycloaliphatic or aromatic group, $R_2$ is a hydrogen atom or lower alkyl, and $R_3$ is an alkylene having at least five carbon atoms, are prepared, for example, by alcoholysis of lower alkyl acrylates with cycloaliphatic- or aromatic-substituted alkanols or by acylation of said alkanols with acryloyl or methacryloyl chloride, or by vinyl ester interchange of lower vinyl esters with cycloaliphatic- or aromatic-substituted alkanoic acids, said carbocyclic alkyl acrylates and vinyl esters being polymerizable monomers useful in forming polymers having utility, for example, as pressure sensitive adhesives.

FIELD OF INVENTION

This invention relates to acrylates and vinyl esters, and to methods for their preparation. In another aspect, it relates to homopolymers and copolymers of said acrylates and vinyl esters, and to methods for the preparation of said polymers. In another aspect, it relates to copolymers of said acrylates and/or vinyl esters with polymerizable vinyl comonomers, such as conventional lower alkyl acrylates and/or methacrylates, and to methods for the preparation of said copolymers. In a still further aspect, it relates to pressure sensitive adhesives made from homopolymers of said carbocyclic alkyl acrylates and vinyl esters or copolymers of these vinyl compounds with lower alkyl acrylates.

PRIOR ART

The relatively long alkylene chain, terminating in a cycloaliphatic or phenyl group, of the acrylates and vinyl esters of this invention, and properties thereof, distinguish them over carbocyclic acrylates and vinyl esters of the prior art. Representative of this prior art are the cyclohexyl acrylates and methacrylates described in J. Org. Chem., September 1950, 4307, in Ind. Eng. Chem. 28 1160 (1936), and in U.S. Pat. 2,268,611 and British Pat. 711,336, the phenyl acrylates described in Ind. Eng. Chem. ibid., the naphthenyl methacrylates in U.S. Pat. 2,268,611, the phenmethyl (i.e., benzyl) and phenethyl acrylates described in U.S. Pat. 2,219,667, in Ind. Eng. Chem. ibid, in J. Am. Chem., Soc. 72 5199 (1950) and in J. Sci. Ind. Res. (India) 16B, 441 (1957), the vinyl 9(10)-phenylstearate described in J. Polymer Sci. A-3 2877 (1965), the acrylates of hydronoporyalkanols described in J. Polymer Sci. A-1 1543 (1963), and the acrylates of homoterphenylmethyl carbinol and alpha-campholenol described in J. Polymer Sci. A-1 1489 (1967). And though the prior art discloses the use of lower or non-carbocyclic acrylate polymers (e.g., U.S. Pat. No. 3,222,419) and carbocyclic acrylate polymers (e.g., U.S. Pat. No. 3,100,-760) in adhesives, such use of the particular carbocyclic acrylate and vinyl ester polymers of this invention are not disclosed or taught.

BRIEF DESCRIPTION OF THE INVENTION

Briefly, this invention provides a new class of carbocyclic acrylates and vinyl esters having the general formula:

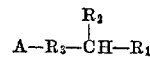

where

A is acryloxy ($CH_2=CHCOO-$), methacryloxy $$[CH_2=C(CH_3)COO-],$$

or carbovinyl oxy ($CH_2=CHOCO-$), $R_1$ is a cycloaliphatic or aromatic group (e.g., phenyl), and $R_2$ is a hydrogen atom or lower alkyl (e.g., with 1 to 6 carbon atoms), and $R_3$ is an alkylene having at least 4 carbon atoms extending in a straight chain, preferably 5 to 10 such carbon atoms.

The cycloaliphatic group preferably will have 5 or 6 ring member atoms, such as cyclopentyl, cyclopentenyl, and cyclohexyl. The aromatic group will be typically phenyl.

The new class of acrylates can be prepared by alcoholysis of lower alkyl acrylates or methacrylates with a cycloaliphatic- or aromatic-substituted alkanol, or by the interreaction of acryloyl or methacryloyl chloride with said alkanol, or by esterification of acrylic or methacrylic acid with said alkanol. The new class of vinyl esters can be made by vinyl ester interchange of a lower vinyl ester, such as vinyl acetate, with cycloaliphatic- or aromatic-substituted alkanoic acids. Said alkanols and alkanoic acids can be represented by the general formula:

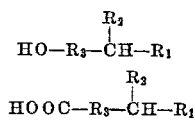

where $R_1$, $R_2$ and $R_3$ are as described above for the carbocyclic acrylates, methacrylates, and vinyl esters.

The new classes of acrylates and vinyl esters of this invention have a polymerizable vinyl group and thus can be homopolymerized, or two or more of them can be copolymerized, or one or more of them can be copolymerized with conventional copolymerizable ethylenically unsaturated comonomers, particularly the vinyl compounds capable of vinyl addition reactions, such as the lower alkyl acrylates and methacrylates. Such homopolymers and copolymers are useful, for example, as pressure sensitive adhesives.

DETAILED DESCRIPTION OF THE INVENTION

The preferred acrylates, methacrylates, and vinyl esters of this invention can be represented by the formula:

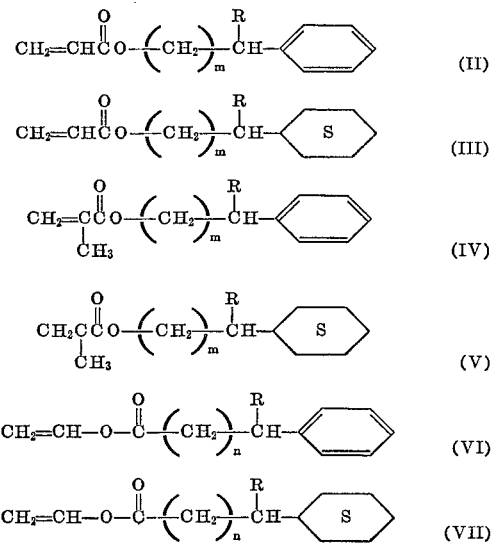

where $m$ is an integer of 4 to 12, preferably 5 to 10, $n$ is an integer from 4 to 9, preferably 6 to 9, and R is a hydrogen atom or a lower alkyl of 1 to 6 carbon atoms.

(The term "acrylate" as used herein includes acrylate and methacrylate, unless otherwise indicated.)

The acrylates and vinyl esters of Formulas II to VII are generally high boiling liquids having freezing points at room temperature or below. They are hydrophobic in nature with their long chain alkylene linkages containing no polar or hydrogen bonding groups and, because of the terminal vinyl group, these acrylates are polymerizable.

The acrylates of this invention can be prepared by various classical procedures such as alcoholysis (ester interchange), acylation, and esterification. Alcoholysis can be carried out by reacting conventional acrylates, particularly the lower alkyl acrylates, with corresponding cyclohexyl-substituted alkanols or phenyl-substituted alkanols in the presence of a strong acid catalyst, such as p-toluenesulfonic acid, concentrated sulfuric acid, concentrated hydrochloric acid, and the like. This reaction is also preferably carried out in the presence of a free radical inhibitor, such as hydroquinone or cuprous chloride, and under a blanket of inert gas such as nitrogen or carbon dioxide to prevent polymerization of the exchanging species. The reaction will generally be run at reflux temperatures of the reaction mixture. The carbocyclic acrylate product can be recovered from the reaction mixture by various conventional procedures, such as fractional distillation under reduced pressure, or solvent extraction.

Where acylation is used to prepare the acrylates, acryloyl or methacryloyl chloride is reacted with, for example, cyclohexyl- or phenyl-substituted alkanol. Where esterification is used, acrylic or methacrylic acid is reacted with the cyclohexyl- or phenyl-substituted alkanol, or the like.

The vinyl esters of this invention can be prepared by vinyl ester interchange. For example, a lower vinyl ester, such as vinyl acetate, is reacted generally at room temperature with the correspoding cyclohexyl- or phenyl-substituted alkanoic acid in the presence of a catalyst, such as mercuric acetate, concentrated sulfuric acid, or the like. Recovery of the carbocyclic vinyl ester product can be accomplished by conventional procedures such as fractional distillation and/or extraction, and the like.

The acrylates and vinyl esters of this invention are especially useful as monomers in the preparation of homopolymers, copolymers or two or more of these polymerizable monomers, or copolymers of one or more of these monomers with conventional copolymerizable ethylenically unsaturated compounds such as those containing a vinyl group. The homopolymers and copolymers of one or more of the novel polymerizable monomers are tacky, tough, strong elastomers. As such, they are especially useful in or as pressure sensitive adhesive compositions, having enhanced tack maximum when compared to conventional acrylate adhesive polymers devoid of a carbocyclic-terminated, long-chain alkylene group. They adhere well to Kraft paper, and other adherends, under load despite the fact that they are essentially hydrophobic in nature and contain no polar or hydrogen bonding side chains, in addition to those associated with ester groups, which are generally considered essential to provide the prerequisite balance of cohesive strength and compliance necessary for high values in a typical packaging application.

The homopolymerization of the novel polymerizable monomers of this invention, or the copolymerization of one or more of such monomers, is carried out in organic solvent solution, or the polymerization can be carried out in suspension or in emulsion, in the presence of a free radical or redox initiator. Preferably, polymerization is carried out in emulsion in the presence of an oxidation-reduction initiator system, such as potassium persulfate and sodium bisulfite.

As mentioned above, the acrylates and vinyl esters of this invention can be copolymerized with other polymerizable ethylenically unsaturated monomers, particularly vinyl compounds. A preferred class of such comonomers are the acrylic and methacrylic acids and their esters of the general formula $CH_2=C(R)COOR'$, where R is a hydrogen atom of methyl, and R' is a hydrogen atom or an n-alkyl or a secondary or branched alkyl, such alkyl groups having from 1 to 18 carbon atoms. These acrylic ester comonomers representatively include methyl, ethyl, propyl, isopropyl, butyl, isobutyl, sec-butyl, pentyl, hexyl, 2-ethylhexyl, heptyl, octyl, isooctyl, nonyl, decyl, dodecyl, acrylates or methacrylates and the like. Copolymerization of the acrylates and vinyl esters of this invention with two or more of these conventional acrylates and methacrylates can be similarly carried out by the free radical initiated solution or emulsion polymerization. The resultant copolymers can be recovered again by precipitation if solution polymerization is used or by coagulation if emulsion polymerization is used. Such copolymers, like the above described homopolymers and copolymers of two or more of the novel methacrylate, acrylates, and vinyl esters of this invention, are generally solid, tough, high molecular weight polymeric materials with relatively high degree of tackiness, making them also suitable in pressure sensitive adhesives.

Other conventional polymerizable monomers which can be copolymerized with one or more of the novel polymerizable monomers of this invention include styrene, alkyl and alkoxy styrenes, such as alpha-methyl styrene and methoxy-styrene, chlorostyrenes, cyano- and carboxy-styrenes, vinyl pyridines, vinyl quinolines, acrylonitrile, methacrylonitrile, acrylamide, methacrylamide, vinyl acetate, higher vinyl esters such as vinyl laurate, and vinyl benzoate, vinyl chloride, vinylidine chloride, olefins such as ethylene and propylene, and conjugated dienes such as 1,3-butadiene, isoprene, chloroprene, 2,3-dimethyl-1,3-butadiene, and the like.

The manipulative polymerization procedures to be used in preparing the polymers of this invention are old in the art and reference is made to "Preparative Methods of Polymer Chemistry," by W. R. Sorenson and T. W. Campbell, published 1961 by Interscience Publisher, Inc., N.Y., (especially Chapter 4), and "Vinyl and Related Polymers," by C. E. Schildknecht, published 1952 by John Wiley & Sons, Inc., N.Y.

As mentioned above, we are particularly interested in using the novel acrylates and vinyl esters of this invention to make polymers having a high degree of inherent tackiness and useful in pressure sensitive adhesives. Such pressure sensitive adhesive compositions are generally prepared by dissolving or dispersing said polymers in an organic liquid solvent such as ethyl acetate, benzene, toluene, chlorobenzene, methylene chloride, tetrahydrofuran, and the like, including mixtures thereof, the total resin solids content in resultant solution or dispersion varying, for example, from 10 to 30 percent by weight. The original polymerization latex itself can be used, and, if desired, such solvents added thereto to obtain the desired solids content.

The resultant polymers are sufficiently tacky and there is no need to mix them with tackifiers, which would usually result in loss of strength.

The adhesive solution or dispersion can be applied to virtually an unlimited variety of substrates, such as paper, cloth, metal sheets and foils, cellophane, wood, and plastic films and sheets, such as those derived from polyethylene terephthalate, polystyrene, rubber hydrochloride, polyethylene, polypropylene, polyvinyl chloride, and polyvinylidene chloride and the like. Any coating technique can be used to apply the adhesive to such substrates. For example, they can be sprayed onto a substrate or applied by the use of any mechanical coating process, such as air knife, trailing blade, reverse roll, or gravure coating technique. The adhesive will usually be applied at coating weight which will give a dry film thickness of about 1 to 5 mils. The coating weights at which the adhesives are applied will, of course, vary according to specific end use application.

It is also within the scope of this invention to apply the adhesive to flexible backing sheets, such as metal, textile, paper, natural or synthetic sheet and tape materials, such as cloth, cellulose and cellulose derivative sheets, and tapes.

EXAMPLES

The objects and advantages of this invention are further illustrated by the following examples, but it should be understood that the particular materials used in these examples, and the amounts thereof, and other conditions and details recited in these examples, should not be construed to unduly limit this invention.

Example 1

In a 500 ml. round-bottom flask equipped with a nitrogen inlet, a 24-inch insulated Vigreaux column, and a total reflux head, were placed 113.2 g. (0.445 mole) 10-cyclohexylundecyl alcohol, 200 ml. (187.5 g., 1.88 mole) methyl methacrylate, 5.0 g. cuprous chloride, and 2 ml. conc. sulfuric acid. Heat was applied and the methyl methacrylate-methanol azeotrope (85% methanol) boiling at 64–65° C. was removed continuously until the temperature at the still head rose to 98–100° C. The reaction mixture was then cooled, 6.0 g. of potassium carbonate added to neutralize the acid, and the excess methyl methacrylate removed in vacuo. The residue was filtered and distilled under nitrogen in the presence of cuprous chloride to give 72.0 g. of 10-cyclohexylundecyl methacrylate, B.P. 146–160° C. at 0.060 mm.

Example 2

The general procedure for Example 1 was employed using 10-phenylundecanol as the alcohol and a 4-molar excess of methyl acrylate to provide 10-phenylundecyl acrylate, B.P. 136° C. at 0.05 mm.

Example 3

To a mixture of 58 g. (0.30 mole) 7-phenylheptanol, 43.2 ml. triethylamine, and 200 ml. dry benzene, cooled to 10° C. with an ice bath, 31.6 g. (0.30 mole) of methacryloyl chloride was added dropwise with stirring while maintaining the temperature of the mixture at 10–15° C. After the addition was complete, the reaction mixture was allowed to stir at ambient temperature overnight. The resulting slurry was then washed thoroughly with water, the benzene layer dried over anhydrous magnesium sulfate and concentrated in vacuo. The residue was distilled in the presence of cuprous chloride to give 7-phenylheptyl methacrylate, B.P. 112–113° C. at 0.5 mm.

Example 4

To a solution of 130 g. of 10-phenylundecanoic acid in 258 g. of vinyl acetate, were added, in order, 2.6 g. of mercuric acetate, and 0.65 g. of conc. sulfuric acid. The dark solution was stirred at room temperature for five days, at which time 5 g. of sodium acetate were added. The remaining vinyl acetate was removed in vacuo and the residue distilled to give 87 g. (60%) of vinyl 10-phenylundecanoate, B.P. 105–125° C. at 0.15 mm.

Examples 5–8

The following monomers were prepared in a manner similar to that described in the above examples.

| Monomer: | B.P., ° C. |
| --- | --- |
| (5) 10-phenylundecyl methacrylate | 139–144° at 0.025 mm. |
| (6) 10-cyclohexylundecyl acrylate | 148° at 0.10 mm. |
| (7) vinyl-10-cyclohexyl-undecanoate | 148–150° at 0.30 mm. |
| (8) 5-phenylpentyl methacrylate | 109–113° at 0.10 mm. |

Example 9

A reaction vessel was charged with 23.5 g. of the 10-cyclohexylundecyl methacrylate, 70 ml. of deoxygenated water and 2.0 g. of an alkylaryl polyoxyethylene wetting agent (Sandozin NI). After purging with nitrogen, there was added 0.100 g. of potassium persulfate and 0.050 g. of sodium bisulfite, and the polymerization mixture was stirred under a blanket of nitrogen for 16 hours at room temperature. The emulsion was coagulated by pouring it into 400 ml. of methanol, the resulting solid polymer was washed with methanol and purified by two precipitations from tetrahydrofuran with methanol. The solid poly(10-cyclohexylundecyl methacrylate) polymer was tough, tacky elastomer exhibiting a glass transition, Tg, at −47° C. and the intrinsic viscosity of 2.80 dl./g. in tetrahydrofuran.

Example 10

The polymerization procedure as described in Example 9 was repeated using 38.5 g. of the 10-phenylundecyl methacrylatet prepared in Example 5, 90 ml. of deoxygenated water, 3.5 g. of Sandozin NI wetting agent, and a catalyst mixture of 0.100 g. of potassium persulfate and 0.050 g. sodium bisulfite. The solid poly(10-phenylundecyl methacrylate) polymer was recovered with tetrahydrofuran and reprecipitated twice with methanol to give a tough, tacky elastomer exhibiting a glass transition at −37° C. and having an intrinsic viscosity of 2.63 dl./g. in tetrahydrofuran.

Example 11

A reaction vessel was charged with 21.6 g. (0.075 mole) of the vinyl 10-phenylundecanoate prepared in Example 7, 100 ml. of deoxygenated water, and 4 g. of sodium polyethyleneglycol aryl sulfonate wetting agent (Triton X–200). After purging with nitrogen, 0.100 g. of potassium persulfate was added, the emulsion heated to 65–70° C. and 14.8 g. (0.075 mole) 2-ethylhexyl acrylate was added dropwise with stirring over a period of two hours. When the addition was complete, stirring was continued at 65–70° C. for 22 hrs. The emulsion was coagulated by pouring into excess methanol and the solid copolymer, poly(vinyl 10-phenylundecanoate-co-2-ethylhexyl acrylate), was separated by centrifugation. Purification by two precipitations from methanol gave 14.0 g. of tough, tacky elastomer having an intrinsic viscosity of 1.44 dl./g. in tetrahydrofuran. Nuclear magnetic resonance spectroscopy indicated a molar ratio of 3:7 for vinyl 10-phenylundecanoate:2-ethylhexyl acrylate in the copolymer.

Examples 12-17

The following illustrates the properties of homopolymers prepared by procedures described above.

| Polymer | Intrinsic viscosity [η], dl./g. | Glass transition Tg, °C. |
|---|---|---|
| 12.... Poly(10-phenylundecyl acrylate) | 2.80 | −43 |
| 13.... Poly(10-cyclohexylundecyl acrylate) | 3.00 | −55 |
| 14.... Poly(vinyl 10-cyclohexylundecanoate) | Oil | |
| 15.... Poly(5-phenylpentyl methacrylate) | (¹) | −7 |
| 16.... Poly(7-phenylheptyl methacrylate) | 1.70 | |
| 17.... Poly(vinyl 10-phenylundecanoate) | 0.45 | |

¹ Crosslinked.

All of these polymers were compliant, amorphous elastomers of high molecular weight, though the molecular weight of Examples 14 and 17 were relatively lower.

Example 18

A copolymer of vinyl 10-phenylundecanoate and n-butyl acrylate was prepared essentially by the procedure outlined in Example 11 utilizing 14.4 g. (0.05 mole) of vinyl 10-phenylundecanoate, 6.6 g. (0.05 mole) of n-butyl acrylate, 60 ml. of deoxygenated water, 3 g. of Triton X–200 wetting agent, and a redox catalyst of 0.100 g. of potassium persulfate and 0.060 g. of sodium bisulfite at room temperature. Recovery of the copolymer with tetrahydrofuran and purification of two precipitations from methanol resulted in 15 g. of copolymer having an intrinsic viscosity of 2.26 dl./g. in tetrahydrofuran. Nuclear magnetic resonance spectroscopy indicated a molar ratio of 15:84 for n-butylacrylate:vinyl 10-phenylundecanoate in the copolymer.

Examples 19-21

The table below illustrates copolymers that have been prepared from the above described monomers using the polymerization technique of Example 18.

| | Monomer | Comonomer | [η] | Comp.* (molar) |
|---|---|---|---|---|
| 19.... | Vinyl 10-cyclohexyl-undecanoate. | Ethyl acrylate | 0.83 | 1:2 |
| 20.... | 10-cyclohexylundecyl acrylate. | iso-Octyl methacrylate | 4.15 | 1:1 |
| 21..... | do | n-Butyl acrylate | 3.5 | 1:1 |

*Molar ratio of monomer:comonomer.

Example 22

This example illustrates the preparation and evaluation of the above-prepared polymers as adhesives.

Solutions of approximately 10% by weight of each of the polymers in tetrahydrofuran were prepared and knife coated into polyethylene terephthalate (Mylar) or cellophane film at a coating thickness of from 10 to 15 mils and coating weights of 2.5 to 3.75 grains/sq. in. Adhesive properties were evaluated as follows: tack maxima were determined as a function of temperature in a modified Kendall tack tester utilizing a ⅙ inch diameter stainless steel probe at a pressure of 100 g./cm.² and a dwell time of one second.

| Polymer | [η] | Tack max. (g.) |
|---|---|---|
| Poly(10-phenylundecyl acrylate) | 2.10 | 170 |
| Poly(10-cyclohexylundecyl acrylate) | 3.10 | 220 |
| Poly(10-phenylundecyl methacrylate) | 2.63 | 180 |
| Poly(10-cyclohexylundecyl methacrylate) | 2.80 | 210 |
| Poly(vinyl 10-phenylundecanoate-co-ethyl acrylate) | 0.8 | 145 |
| Poly(vinyl 10-phenylundecanoate-co-ethylhexyl acrylate) | 2.30 | 175 |
| Poly(vinyl 10-phenylundecanoate-co-n-butyl acrylate) | 2.26 | 120 |
| Poly(10-cyclohexylundecyl acrylate-co-n-butyl acrylate) | 3.50 | 280 |
| Poly(10-cyclohexylundecyl acrylate-co-iso-octyl methacrylate) | 4.15 | 180 |

Example 23

This example illustrates the evaluation of two of the above prepared polymers in a packaging application.

Sample tapes for evaluation were prepared as described in Example 22 and used to determine their package sealing ability. Kraft paper bags filled with 2-pound quantities of beans were closed with four folds and sealed with a two-inch long strip of half-inch tape applied across the fold. The tape was applied with a light stroking motion of the fingertips. Tape samples of poly(10-cyclohexylundecyl methacrylate) (Example 9) and poly(10-phenylundecyl methacrylate (Example 10) when utilized in this test adhered firmly and completely when first applied and the bags remained sealed.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. Compounds of the formula

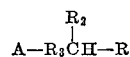

where A is acryloxy or methacryloxy, $R_1$ is cyclohexyl, cyclopentyl, or cyclopentenyl, $R_2$ is a hydrogen atom or lower alkyl, and $R_3$ is an alkylene having at least 4 carbon atoms extending in a chain.

2. Compounds according to claim 1, wherein $R_1$ is cyclohexyl, $R_2$ is a hydrogen atom, and $R_3$ is an alkylene with 5 to 10 carbon atoms extending in a chain.

3. Compounds according to claim 1 where A is acryloxy.

4. Compounds according to claim 1 where A is methacryloxy.

5. 10-cyclohexylundecyl methacrylate.

6. 10-cyclohexylundecyl acrylate.

References Cited

UNITED STATES PATENTS

| 2,447,050 | 8/1948 | Bludworth et al. | 260—486 X |
| 3,536,687 | 10/1970 | Nordstrom | 260—486 X |
| 2,618,652 | 11/1952 | Hollyday | 260—486 R |

FOREIGN PATENTS

| 767,145 | 9/1967 | Canada | 260—486 |

LORRAINE A. WEINBERGER, Primary Examiner

P. J. KILLOS, Assistant Examiner

U.S. Cl. X.R.

106—287 R; 117—132 R, 138.8 A, 148, 161; 260—85.5 ES, 86.1 E, 86.3, 86.7, 410.9 R, 468 R, 476 R

UNITED STATES PATENT OFFICE
CERTIFICATE OF CORRECTION

Patent No. 3,751,449          Dated August 7, 1973

Inventor(s) Ramis Gobran, Hanspeter Knoepfel and Spencer F. Silver

It is certified that error appears in the above-identified patent and that said Letters Patent are hereby corrected as shown below:

Column 2, line 3, "hydronoporyalkanols" should read --hydronopoxyalkanols--;

Column 8, line 38, in the formula, "R" should read --$R_1$--.

Signed and sealed this 20th day of November 1973.

(SEAL)
Attest:

EDWARD M. FLETCHER, JR.          RENE D. TEGTMEYER
Attesting Officer                Acting Commissioner of Patents